(12) United States Patent
Chuang

(10) Patent No.: US 8,864,864 B2
(45) Date of Patent: Oct. 21, 2014

(54) CIRCULAR CYLINDER AIR FILTER

(71) Applicant: Ye Siang Enterprise Co., Ltd., New Taipei City (TW)

(72) Inventor: Shih-Chieh Chuang, New Taipei City (CA)

(73) Assignee: Ye Siang Enterprise Co., Ltd., New Taipei (TW)

( * ) Notice: Subject to any disclaimer, the term of this patent is extended or adjusted under 35 U.S.C. 154(b) by 52 days.

(21) Appl. No.: 13/691,849

(22) Filed: Dec. 3, 2012

(65) Prior Publication Data

US 2014/0150387 A1   Jun. 5, 2014

(51) Int. Cl.
 B01D 46/00 (2006.01)

(52) U.S. Cl.
 CPC .................................. B01D 46/0024 (2013.01)
 USPC .................. 55/486; 55/512; 55/515; 55/516; 55/517; 96/108; 96/138; 96/147; 96/151

(58) Field of Classification Search
 CPC ............... B01D 29/0025; B01D 27/07; B01D 29/0018; B01D 24/08; B01D 46/0024; B01D 46/10; B01D 46/521; B01D 2265/06; B01D 46/2411; B01D 46/2414
 USPC ........... 55/486, 492, 498, 523, 487, 510, 120, 55/146, 512, 515–517; 96/138, 147, 151
 See application file for complete search history.

(56) References Cited

U.S. PATENT DOCUMENTS

| | | | | |
|---|---|---|---|---|
| 2,158,512 A | * | 5/1939 | Layte et al. | 210/458 |
| 2,185,584 A | * | 1/1940 | Boyce | 55/517 |
| 3,016,984 A | * | 1/1962 | Getzin | 55/492 |
| 3,434,479 A | * | 3/1969 | Koch et al. | 131/334 |
| 3,767,054 A | * | 10/1973 | Farrow et al. | 210/232 |
| 3,960,509 A | * | 6/1976 | Abriany | 422/181 |
| 4,015,959 A | * | 4/1977 | Grote | 96/136 |
| 4,278,455 A | * | 7/1981 | Nardi | 55/337 |
| 4,304,580 A | * | 12/1981 | Gehl et al. | 55/482 |
| 4,350,509 A | * | 9/1982 | Alseth et al. | 55/337 |
| 4,838,901 A | * | 6/1989 | Schmidt et al. | 95/90 |
| 5,112,372 A | * | 5/1992 | Boeckermann et al. | 96/388 |
| 5,169,528 A | * | 12/1992 | Karbachsch et al. | 210/264 |
| 5,211,846 A | * | 5/1993 | Kott et al. | 210/232 |

(Continued)

FOREIGN PATENT DOCUMENTS

JP    53060881 A  *  5/1978  ............. B01D 15/02

*Primary Examiner* — Robert A Hopkins
*Assistant Examiner* — Stephen Hobson
(74) *Attorney, Agent, or Firm* — CKC & Partners Co., Ltd.

(57) ABSTRACT

A circular cylinder air filter includes an inner cylindrical frame, an outer cylindrical frame, a circular disc, a bonding base and a non-woven fabric cover. The outer cylindrical frame is coaxially arranged around the inner cylindrical frame. The circular disc is fastened to a first end of the inner cylindrical frame and the outer cylindrical frame. The bonding base is fastened to an opposite second end of the inner cylindrical frame and the outer cylindrical frame. A first opening of the bonding base communicates with a first hollow region between the inner cylindrical frame and the outer cylindrical frame. A second opening of the bonding base communicates with a second hollow region within the inner cylindrical frame. The air filter medium is filled into the first hollow region through the first opening. The fabric cover encloses the outer cylindrical frame, circular disc and bonding base to expose the second opening.

4 Claims, 7 Drawing Sheets

(56) References Cited

U.S. PATENT DOCUMENTS

| | | | |
|---|---|---|---|
| 5,478,379 A * | 12/1995 | Bevins | 96/119 |
| 5,591,338 A * | 1/1997 | Pruette et al. | 210/493.1 |
| 5,622,537 A * | 4/1997 | Kahlbaugh et al. | 55/320 |
| 5,800,587 A * | 9/1998 | Kahlbaugh et al. | 55/486 |
| 5,851,269 A * | 12/1998 | Strope | 96/144 |
| 5,871,641 A * | 2/1999 | Davidson | 210/193 |
| 6,027,639 A * | 2/2000 | Lenhart et al. | 210/108 |
| 6,093,237 A * | 7/2000 | Keller et al. | 95/287 |
| 6,217,639 B1 * | 4/2001 | Jackson | 96/134 |
| 6,358,292 B1 * | 3/2002 | Clements | 55/498 |
| 6,368,506 B1 * | 4/2002 | Gebert et al. | 210/493.1 |
| 6,375,698 B1 * | 4/2002 | Clements et al. | 55/341.1 |
| 6,706,087 B1 * | 3/2004 | Gebler et al. | 55/492 |
| 7,090,708 B2 * | 8/2006 | Winter et al. | 55/357 |
| 7,267,706 B2 * | 9/2007 | Schaerlund et al. | 55/492 |
| 7,320,723 B2 * | 1/2008 | Sewell, Sr. | 55/512 |
| 7,645,310 B2 * | 1/2010 | Krisko et al. | 55/337 |
| 7,670,398 B2 * | 3/2010 | Modesto | 55/374 |
| 7,896,952 B2 * | 3/2011 | Ballard et al. | 95/136 |
| 7,935,161 B1 * | 5/2011 | Adams | 55/337 |
| 8,057,669 B2 * | 11/2011 | Beard et al. | 210/232 |
| 8,523,973 B2 * | 9/2013 | Ackermann et al. | 55/498 |
| 8,652,228 B2 * | 2/2014 | Krisko et al. | 55/337 |
| 2002/0185454 A1 * | 12/2002 | Beard et al. | 210/749 |
| 2003/0010002 A1 * | 1/2003 | Johnson et al. | 55/486 |
| 2007/0020159 A1 * | 1/2007 | Tsui | 422/186.04 |
| 2007/0201183 A1 * | 8/2007 | Komatsu et al. | 361/311 |
| 2011/0000373 A1 * | 1/2011 | Crawford et al. | 95/274 |
| 2011/0311400 A1 * | 12/2011 | Billingsley et al. | 422/120 |
| 2012/0055126 A1 * | 3/2012 | Whittier et al. | 55/414 |

\* cited by examiner

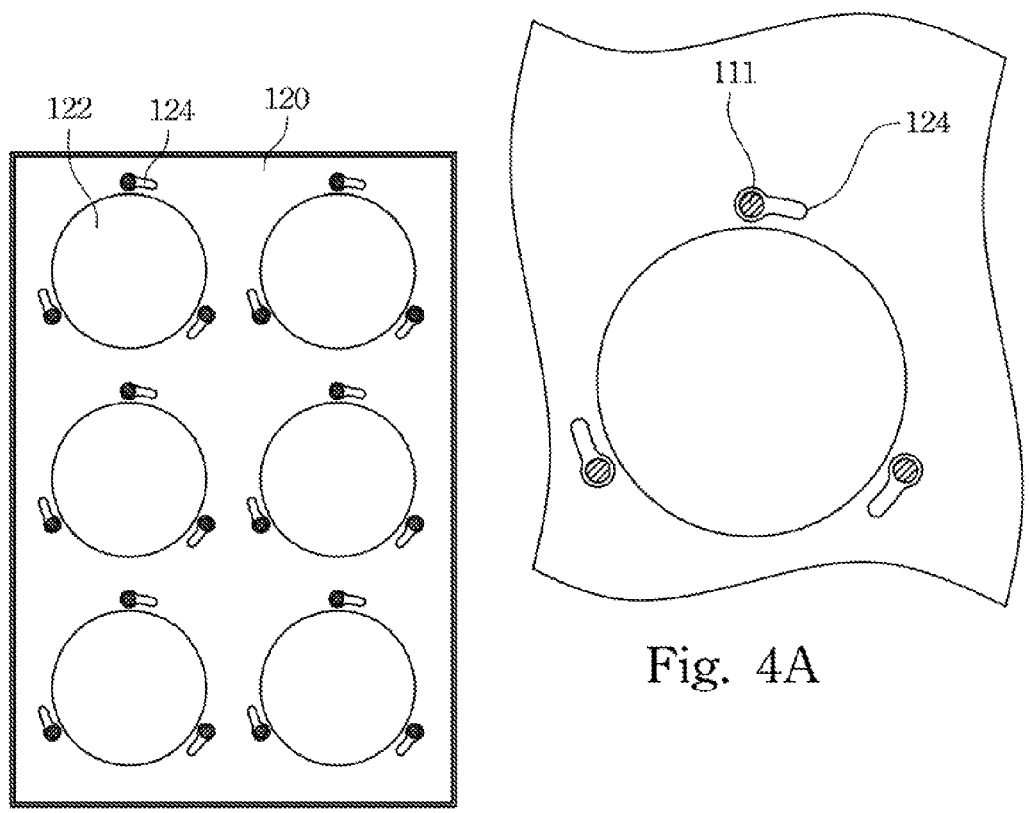
Fig. 4
Fig. 4A
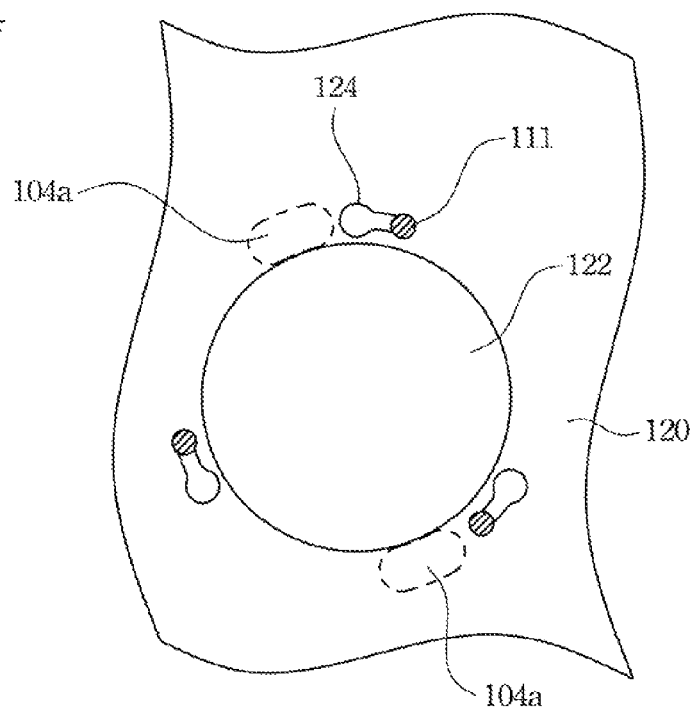
Fig. 4B

CIRCULAR CYLINDER AIR FILTER

BACKGROUND

1. Field of Invention

The present invention relates to an air filter device.

2. Description of Related Art

Conventional circular cylinder air filter contains air filter medium. After the air filter medium and the airflows to be filtered produce a chemical reaction and lose of filtering utility, the replaced cylindrical frame can only be disposed aside and can not be re-used, obviously not comply with the environmental protection concept.

SUMMARY

It is therefore an objective of the present invention to provide a circular cylinder air filter with air filter medium replaceable function.

In accordance with the foregoing and other objectives of the present invention, circular cylinder air filter includes a hollow inner cylindrical frame, a hollow outer cylindrical frame, a circular disc, a bonding base and a non-woven fabric cover. The inner cylindrical frame has a plurality of first filter webs. The outer cylindrical frame is coaxially arranged around the inner cylindrical frame and has a plurality of second filter webs. The circular disc is fastened to a first end of the inner cylindrical frame and the outer cylindrical frame. The bonding base is fastened to an opposite second end of the inner cylindrical frame and the outer cylindrical frame. The bonding base has a first opening and a second opening. The first opening communicates with a first hollow region between the inner cylindrical frame and the outer cylindrical frame. The second opening communicates with a second hollow region within the inner cylindrical frame. A plurality of air filter medium is filled into the first hollow region through the first opening, wherein the air filter medium has a dimension that is greater than any filter hole of the first filter webs and the second filter webs. The non-woven fabric cover encloses the outer cylindrical frame, the circular disc and the bonding base to expose the second opening, and airflows to be filtered is introduced into the second hollow region through the second opening, filtered via the air filter medium within the first hollow region and finally filtered via the non-woven fabric cover.

According to another embodiment disclosed herein, the non-woven fabric cover is a fabric cover made from polypropylene fiber.

According to another embodiment disclosed herein, the non-woven fabric cover is a fabric cover made from polyethylene fiber.

According to another embodiment disclosed herein, the first hollow region has a thickness ranging from about 10 mm to about 25 mm.

According to another embodiment disclosed herein, the first hollow region has a thickness of 22 mm.

According to another embodiment disclosed herein, the first hollow region has a thickness of 12 mm.

According to another embodiment disclosed herein, the air filter medium has a concentration of greater than 12 percent sodium permanganate by weight.

According to another embodiment disclosed herein, the bonding base is a disc-shaped member, which has three positioning pins disposed at a rim thereof.

According to another embodiment disclosed herein, the three positioning pins are symmetrical as to a center of the bonding base.

According to another embodiment disclosed herein, any adjacent two of the three positioning pins and the center of the bonding base forms two virtual lines, which has an included angle of 120 degrees therebetween.

Thus, the circular cylinder air filter disclosed herein has the filter medium hole designed on the bonding base. When the bonding base is fastened to the back plane, the filter medium hole is blocked by the back plane such that the plastic cover sealing the filter medium hole would not be pushed out due to the high pressure. In addition, a distance between the inner and outer cylindrical frame, i.e., a thickness of the first hollow region, is reduced to effectively reduce the pressure loss. The circular cylinder air filter can also be enclosed by a non-woven fabric cover made from polyethylene fibers or polypropylene fibers to filter different types of airflows.

It is to be understood that both the foregoing general description and the following detailed description are by examples, and are intended to provide further explanation of the invention as claimed.

BRIEF DESCRIPTION OF THE DRAWINGS

The accompanying drawings are included, to provide a further understanding of the invention, and are incorporated in and constitute a part of this specification. The drawings illustrate embodiments of the invention and, together with the description, serve to explain the principles of the invention. In the drawings.

FIG. 4 illustrates a back plane to which the circular cylinder air filter is secured according to one preferred embodiment of this invention;

FIGS. 4A and 4B illustrate two status of the circular cylinder air filter being secured to the back plane in FIG. 4;

DESCRIPTION OF THE PREFERRED EMBODIMENTS

Figure 1:
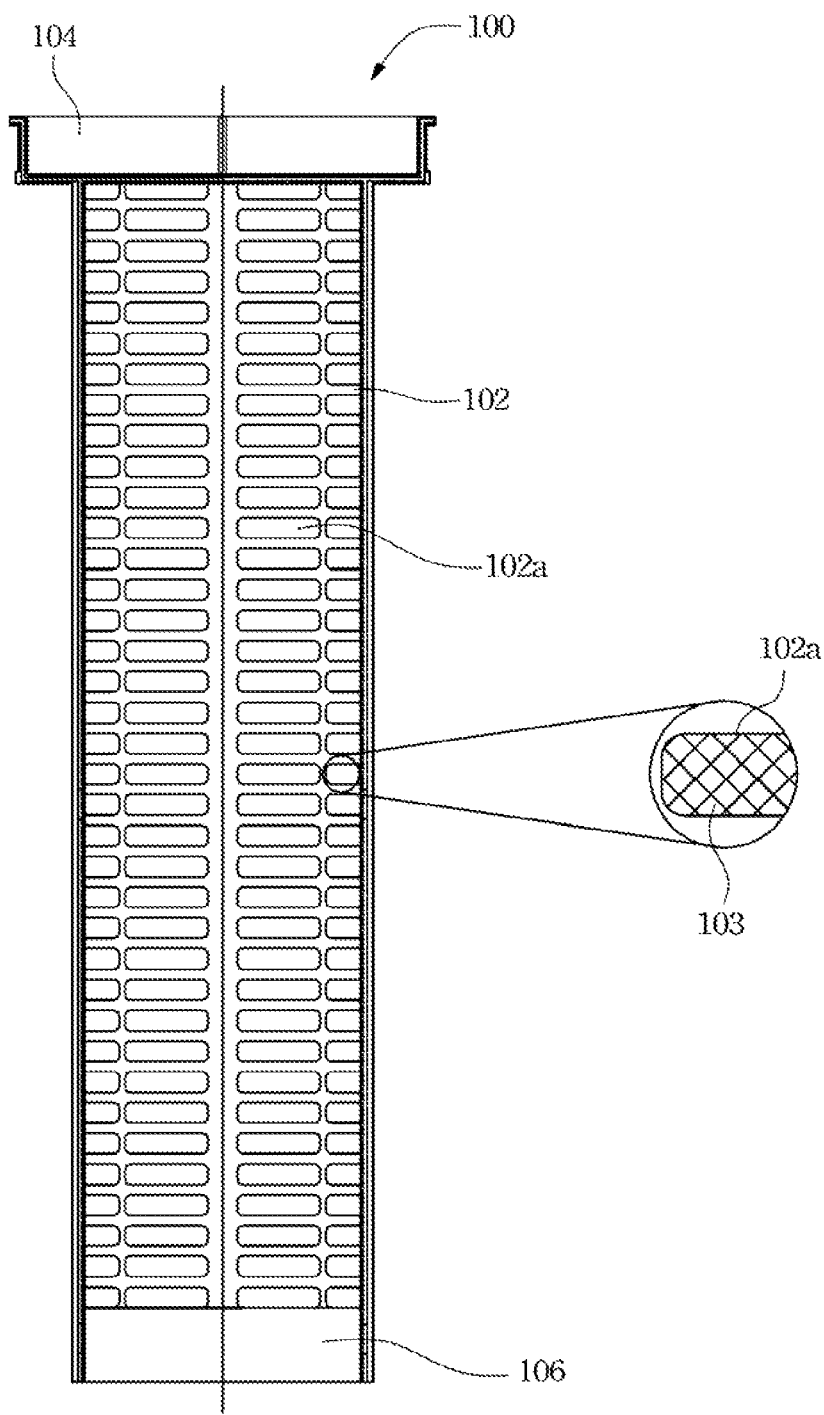
FIG. 1 illustrates an inner cylindrical frame of a circular cylinder air filter according to one preferred embodiment of this invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 illustrates an inner cylindrical frame of a circular cylinder air filter according to one preferred embodiment of this invention. The circular cylinder air filter 100 includes an inner cylindrical frame and an outer cylindrical frame that are both made from plastic materials. Only the hollow inner cylindrical frame 102 is illustrated in FIG. 1. The inner cylindrical frame 102 has a plurality of plain-woven filter webs 102a. Any filter hole 103 of the plain-woven filter webs 102a is smaller than air filter medium such that the air filter medium is not dropped out of the inner cylindrical frame or the outer cylindrical frame.

Figure 2A:
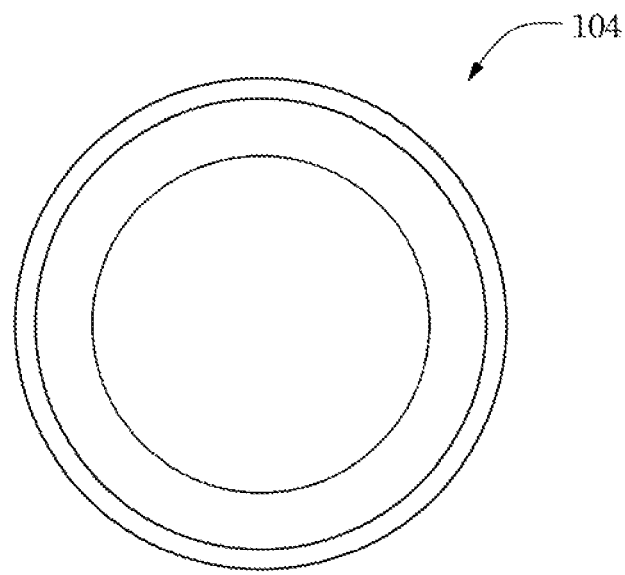
FIG. 2A illustrates a circular disc of a circular cylinder air filter according to one preferred embodiment of this invention.

FIG. 2A illustrates a circular disc of a circular cylinder air filter according to one preferred embodiment of this invention. A plastic circular disc 104 is secured to an end of the inner cylindrical frame 102 (referring to FIG. 1).

Figure 2B:
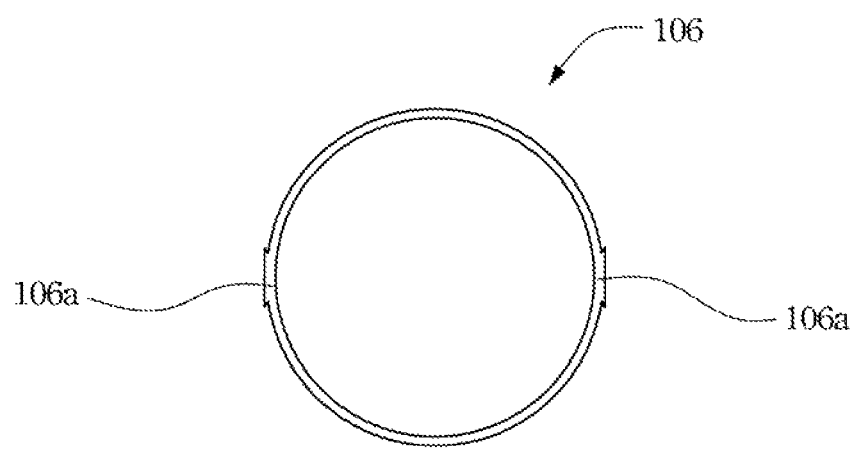
FIG. 2B illustrates a bottom view of the inner cylindrical frame of the circular cylinder air filter according to one preferred embodiment of this invention.

FIG. 2B illustrates a bottom view of the inner cylindrical frame of the circular cylinder air filter according to one preferred embodiment of this invention. An end 106 of the inner cylindrical frame 102 has two connection members 106a to be fastened to a bonding base.

Figure 3A:
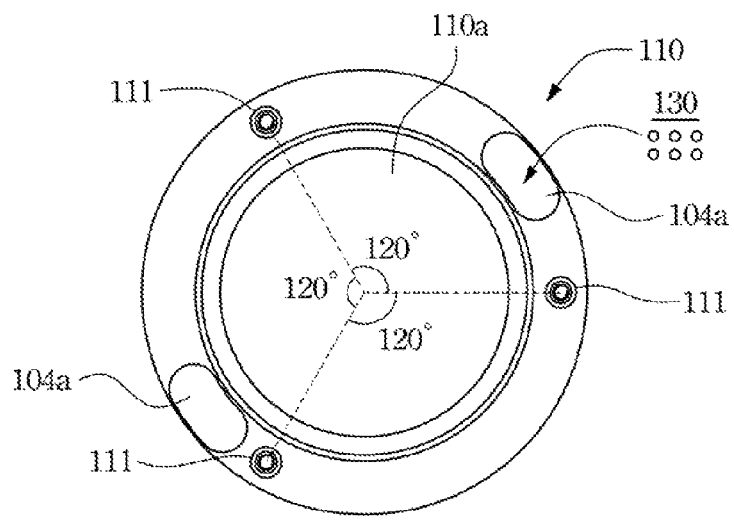
FIG. 3A illustrates a top view of a bonding base of a circular cylinder air filter according to one preferred embodiment of this invention.
Figure 3B:
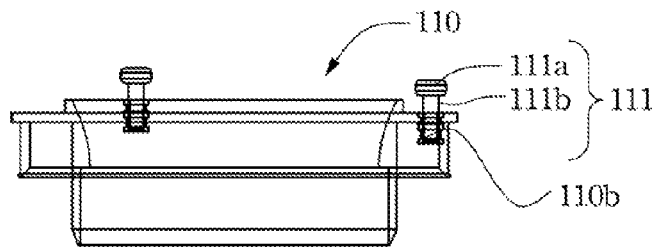
FIG. 3B illustrates a side view of the bonding base of the circular cylinder air filter in FIG. 3A.
Figure 3C:
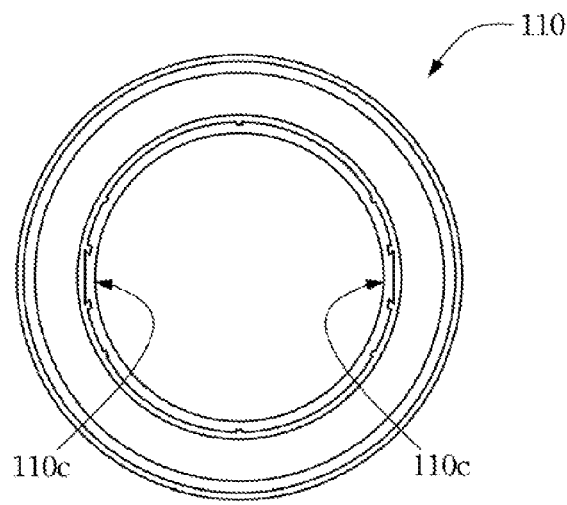
FIG. 3C illustrates a bottom view of the bonding base of the circular cylinder air filter in FIG. 3A.

FIG. 3A illustrates a top view of a bonding base of a circular cylinder air filter according to one preferred embodiment of this invention, and FIG. 3B illustrates a side view of the bonding base of the circular cylinder air filter in FIG. 3A, and FIG. 3C illustrates a bottom view of the bonding base of the circular cylinder air filter in FIG. 3A. Two connection members 110c at a bottom end of the plastic bonding base 110 are used to be fastened with two connection members 106a of the inner cylindrical frame 102. The bonding base 110 is embedded with three metallic nuts 110b for three positioning pins 111 to be screwed into. In this embodiment, the bonding base 110 is also a disc-shaped member, e.g., has the same dimension as the circular disc 104. The bonding base 110 is equipped with three positioning nuts 110b located at a rim thereof. In particular, any adjacent two of the three nuts 110b and the center of the bonding base form two virtual lines, which has an included angle of 120 degrees therebetween. Each positioning pin 111 includes a head portion 111a and a shaft portion 111b, and each shaft portion 111b is equipped with a threaded section to be screwed into a nut 110b. The head portion 111a has a larger cross-section than the shaft portion 111b has. Besides, the bonding base 110 is equipped with one or more first openings 104a through which the air filter medium 130 can be filled into or taken out. When the air filter medium 130 is all filled, a plastic cover may be needed to seal the first opening 104a to prevent the air filter medium 130 from dropping out.

FIG. 4 illustrates a back plane to which the circular cylinder air filter is secured according to one preferred embodiment of this invention. The back plane 120 has multiple air inlets 122 and each air inlet 122 has three positioning holes 124 located around thereof. The bonding base 110 of the circular cylinder air filter 100 is vertically connected to the back plane 120 and the opening 110a is aligned with the air inlet 122. When the bonding base 110 is desired to be fastened to the back plane 120, the head portion 111a of the positioning pin 111 is inserted through the positioning hole 124 (e.g., bigger portion illustrated in FIG. 4A), and the circular cylinder an filter 100 is rotated to move each positioning pin 111 to engage a smaller portion of the positioning hole 124 (referring to FIG. 4B). Because the head portion 111a is larger than the smaller portion of the positioning hole 124, the bonding base 110 is able to secure the circular cylinder air filter 100 to the back plane 120 by means of the positioning pin 111 engaging the positioning hole 124. When the circular cylinder air filter 100 is secured to the back plane 120, airflows to be filtered are introduced into the hollow region within the inner cylindrical frame 102 through the air inlet 122. In addition, after the circular cylinder air filter 100 is secured to the back plane 120, the first opening 104a is blocked by the back plane 120 (referring to FIG. 4B) such that the plastic cover sealing the first opening 104a would not be pushed out due to the high pressure.

Figures 5, 5A:
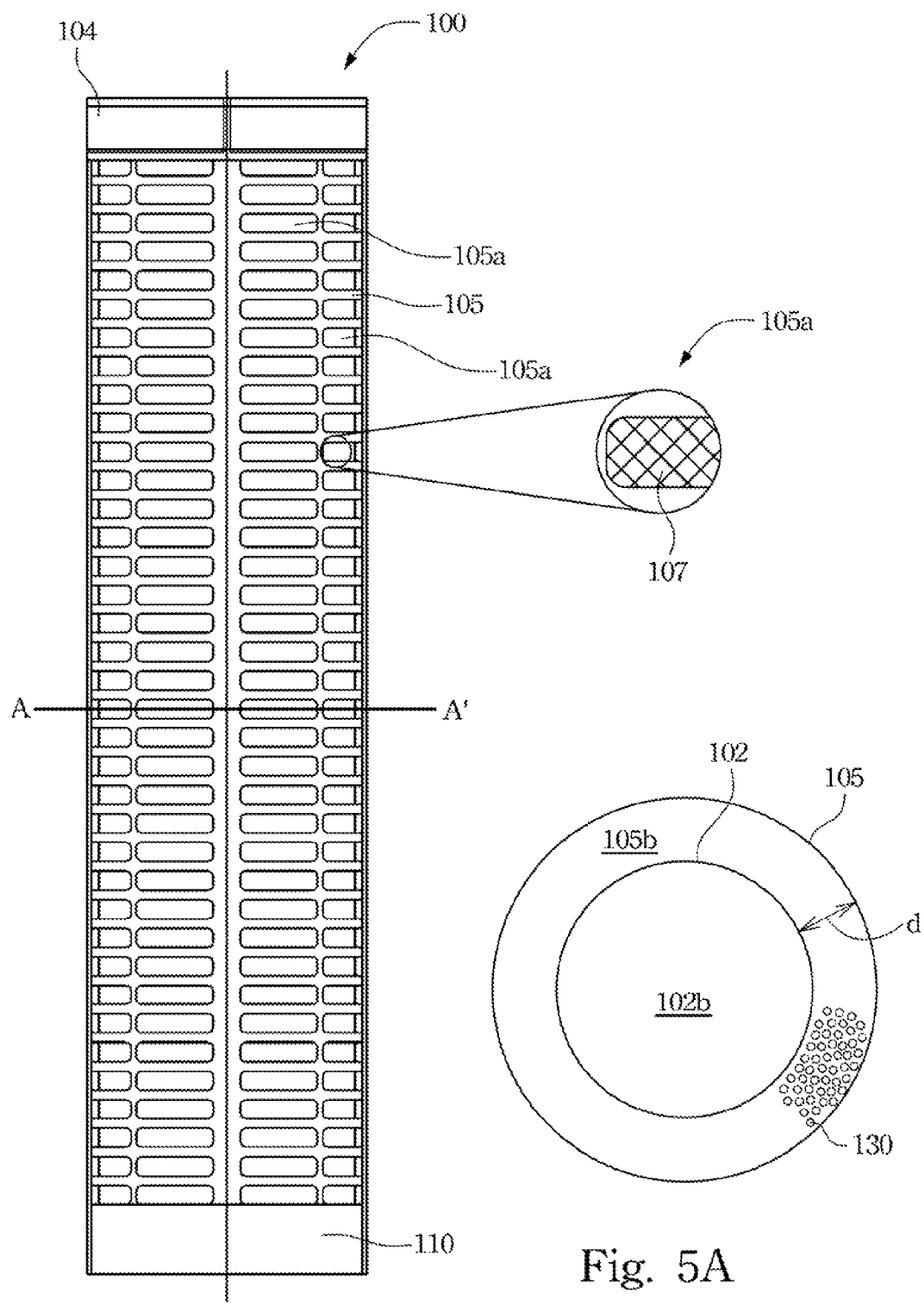
FIG. 5 illustrates a complete circular cylinder air filter according to one preferred embodiment of this invention.
FIG. 5A illustrates a cross-sectional view taken along the line A-A' in FIG. 5.

FIG. 5 illustrates a complete circular cylinder air filter according to one preferred embodiment of this invention. FIG. 5A illustrates a cross-sectional view taken along the line A-A' in FIG. 5. A complete circular cylinder air filter includes a hollow inner cylindrical frame 102 (referring to FIG. 1) and a hollow outer cylindrical frame 105. The outer cylindrical frame 105 is coaxially arranged around the inner cylindrical frame 102. The outer cylindrical frame 105 and the inner cylindrical frame 102 share the same designs and have rectangular plain-woven filter webs 105a. The air filter medium 130 is filled into the first hollow region 105b between the inner cylindrical frame 102 and the outer cylindrical frame 105 through the first opening 104a (referring also to FIG. 3A). Any filter hole 107 of the plain-woven filter webs 105a is smaller than the air filter medium 130 filled within the first hollow region 105b such that the air filter medium would not be dropped out.

Referring FIG. 3A, FIG. 4B and FIG. 5A, an airflow filtering route of the circular cylinder air filter is explained. Airflows to be filtered are introduced into the second hollow region 102b within the inner cylindrical frame 102 through the air inlet 122 on the back plane 120, and passed through the plain-woven filter webs of the inner cylindrical frame 102, reacted and filtered by the air filter medium 130 (within the first hollow region 105b), and finally directed out of the plain-woven filter webs of the outer cylindrical frame 105.

In this embodiment, the air filter medium 130 has a concentration of greater than 12 percent sodium permanganate by weight. Therefore, the first hollow region 105b could have a thickness d ranging from about 10 mm to about 25 mm to enable the first hollow region 105b to have a smaller pressure loss than a conventional hollow region with a thickness of more than 30 mm. In this embodiment, the thickness d of the first hollow region 105b can be 12 mm or 22 mm. According to the experiment results, the air filter medium 130 with about 12 percent sodium permanganate filled within the first hollow region 105b of a thickness 12 mm perform the same air cleaning effectiveness as the conventional air filter medium with about 6 percent potassium permanganate filled within the first hollow region 105b of a thickness 30 mm.

Figure 6:
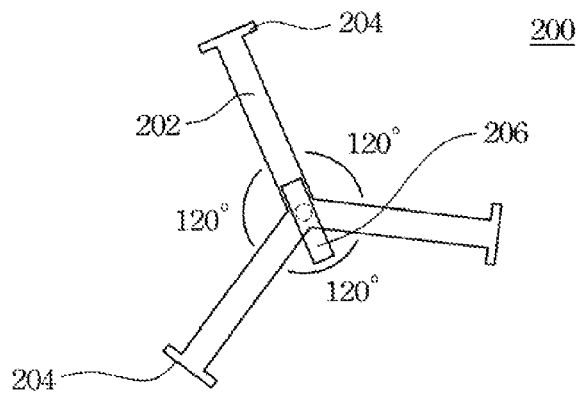
FIG. 6 illustrates an assembly tool of the circular cylinder air filter according to one preferred embodiment of this invention.
Figure 6A:
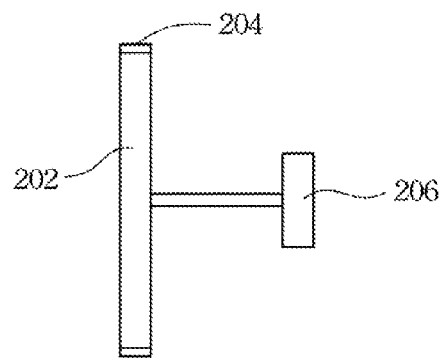
FIG. 6A illustrates a side view of the assembly tool in FIG. 6.
Figure 6B:
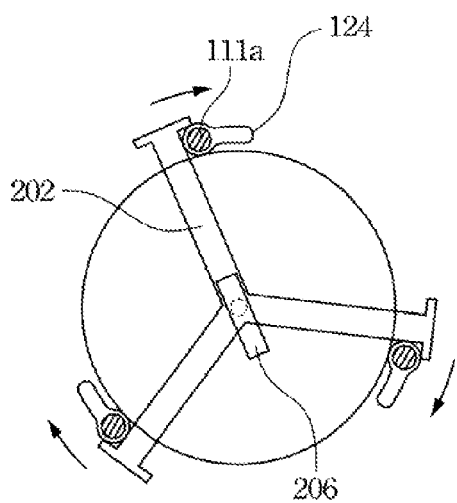
FIG. 6B illustrates a side view of the assembly tool in FIG. 6.

FIG. 6 illustrates an assembly tool of the circular cylinder air filter according to one preferred embodiment of this invention. FIG. 6A illustrates a side view of the assembly tool in FIG. 6. FIG. 6B illustrates a side view of the assembly tool in FIG. 6. In order to assemble the circular cylinder air filter 100 to the back plane 120 or take the circular cylinder air filter 100 apart from the back plane 120, an assembly tool 200 is provided to assist assembling or disassembling the circular cylinder air filter. The assembly tool 200 may include a handle 206 and three arms 202. The three arms 202 share a connection end and any adjacent two arms 202 form an included angle of 120 degrees therebetween. The handle 206 is secured to the connection end of the three arms 202 for a user to apply a torsion force. A free end of each arm 202 has a fastener 204. When the bonding base 110 is being attaching to the back plane 120, the head portion 111a of each positioning pin 111 is inserted through a larger portion of the positioning hole 124, the assembly tool 200 is used with each fastener 204 carrying a corresponding head portion 111a to move to a smaller portion of the positioning hole 124. The arm number of the assembly tool 200 can be varied according to the positioning pin's number and not limited to three arms.

Figure 7:
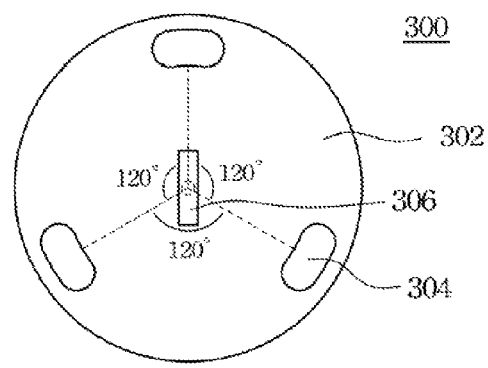
FIG. 7 illustrates another assembly tool of the circular cylinder air filter according to another preferred embodiment of this invention.

FIG. 7 illustrates another assembly tool of the circular cylinder air filter according to another preferred embodiment of this invention. In addition to the assembly tool 200 illustrated in FIG. 6, other assembly tools to carry three head portions 111a of the bonding base 110 can be developed by persons skilled in the art. For example, a disk-shaped assembly tool 300 is equipped with three fastening holes 304 to carry the three head portions 111a, respectively. Any adjacent two of the three fastening holes 304 and a center of disk-shaped assembly tool 300 forms two virtual lines, which has an included angle of 120 degrees therebetween. The disk-shaped assembly tool 300 is also equipped with a handle 306 for a user to apply a torsion force.

Figure 8:
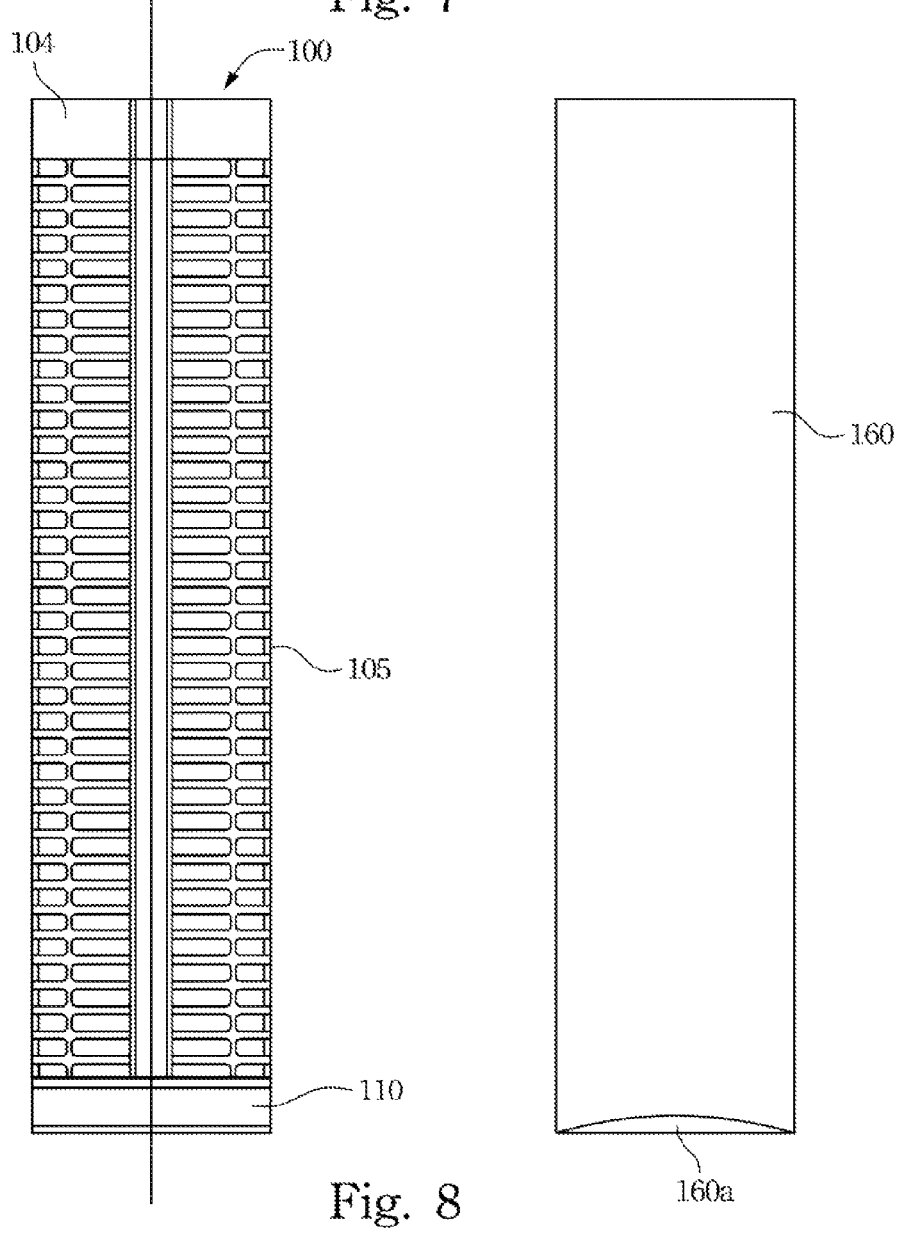
FIG. 8 illustrates another circular cylinder air filter according to another preferred embodiment of this invention.

FIG. 8 illustrates another circular cylinder air filter according to another preferred embodiment of this invention. When the circular cylinder air filter 100 performs air filtering and cleaning, the air filter medium may be stirred to generate small particles. In this embodiment, an non-woven fabric cover 160 may be added to cover the outer cylindrical frame 105, the circular disc 104 and the bonding base 110 to expose the second opening 110a by its opening 160a, such that the airflows to be filtered are introduced through the opening 160a of the non-woven fabric, cover 160. The non-woven fabric cover 160 screens out the particles of smaller sizes than any filter hole of the plain-woven filter webs in the filtered airflows. In this embodiment, the non-woven fabric cover 160 can be a fabric cover made from polypropylene fiber or a fabric cover made from polyethylene fiber. When the non-woven fabric cover 160 is a fabric cover made from polypropylene fibers, the non-woven fabric cover 160 tends to absorb oils in the air, and is used to filter the airflows with fewer oils. When the non-woven fabric cover 160 is a fabric cover made from polyethylene fibers, the non-woven fabric cover 160 tends to not absorb oils in the air, and is used to filter the airflows with more oils, thereby not causing too much pressure loss due to oils attached to the non-woven fabric cover.

According to the above-discussed embodiments, the circular cylinder air filter disclosed herein has the filter medium hole designed on the bonding base. When the bonding base is fastened to the back plane, the filter medium hole is blocked by the back plane such that the plastic cover sealing the filter medium hole would not be pushed out due to the high pressure. In addition, a distance between the inner and outer cylindrical frame, i.e., a thickness of the first hollow region, is reduced to effectively reduce the pressure loss. The circular cylinder air filter can also be enclosed by a non-woven fabric cover made from polyethylene fibers or polypropylene fibers to filter different types of airflows.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A circular cylinder air filter comprising:
a hollow inner cylindrical frame having a plurality of first filter holes, each first filter hole having a first filter web disposed within;
a hollow outer cylindrical frame being coaxially disposed around the inner cylindrical frame and having a plurality of second filter holes, each second filter hole having a second filter web disposed within;
a circular disc fastened to a first end of the inner cylindrical frame and the outer cylindrical frame;
a bonding base fastened to an opposite second end of the inner cylindrical frame and the outer cylindrical frame, the bonding base having a first opening and a second opening, the first opening communicates with a first hollow region between the inner cylindrical frame and the outer cylindrical frame, the second opening communicates with a second hollow region within the inner cylindrical frame, wherein the first hollow region has a thickness ranging from about 10 mm to about 25 mm, wherein the bonding base is a disc-shaped member, which has three positioning pins disposed at a rim thereof, the three positioning pins are symmetrical as to a center of the bonding base;
a back plane having an air inlet, when the bonding base is secured to the back plane, the second opening is aligned with the air inlet and the first opening is blocked by the back plane;
a plurality of air filter media being filled into the first hollow region through the first opening, the air filter media having a dimension that is greater than any filter hole of the first filter webs and the second filter webs, wherein the air filter media has a concentration of greater than 12 percent sodium permanganate by weight,
airflows to be filtered being introduced into the second hollow region through the air inlet of the back plane and the second opening, filtered via the air filter media within the first hollow region.

2. The circular cylinder air filter of claim 1, wherein the first hollow region has a thickness of 22 mm.

3. The circular cylinder air filter of claim 1, wherein the first hollow region has a thickness of 12 mm.

4. The circular cylinder air filter of claim 1, wherein any adjacent two of the three positioning pins and the center of the bonding base forms two virtual lines, which has an included angle of 120 degrees therebetween.

* * * * *